F. McMANUS.
Axle.
No. 65,411. Patented June 4, 1867.
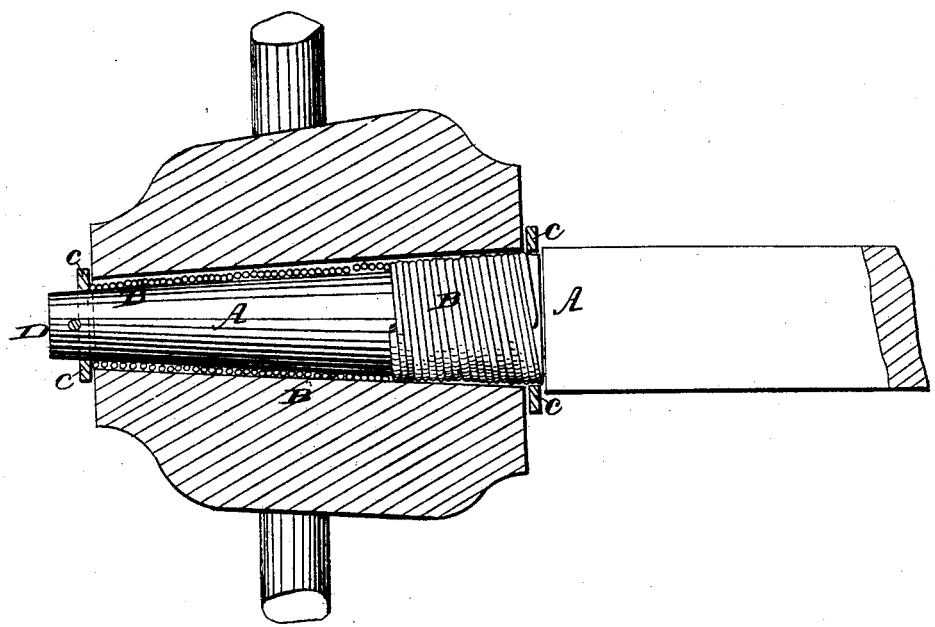
Witnesses
Theo Tusch
J. A. Service
Inventor
F. McManus
Per Munn
Attorneys

United States Patent Office.

F. McMANUS, OF ELLENBURG CENTRE, NEW YORK.

Letters Patent No. 65,411, dated June 4, 1867.

---

IMPROVEMENT IN AXLES FOR WAGONS, &c.

---

The Schedule referred to in these Letters Patent and making part of the same.

---

TO ALL WHOM IT MAY CONCERN:

Be it known that I, F. McMANUS, of Ellenburg Centre, in the county of Clinton, and State of New York, have invented a new Improvement in Axles for Wagons, Carts, &c.; and I do hereby declare that the following is a full, clear, and exact description thereof, which will enable others skilled in the art to make and use the same, reference being had to the accompanying drawings, forming a part of this specification, in which the figure is a top view of a wagon-axle illustrating my improvement, and showing in red lines a section of a hub placed thereon.

My invention consists in winding a wooden axle with wire to prevent it from wear, as hereinafter more fully described.

A is an ordinary wooden axle, about the construction of which there is nothing new. B is a wire wound around the part of the axle A, upon which the wheel revolves from end to end of said part. The ends of the wire B are secured in place by being bent over and inserted in holes formed in the axle A; or the said ends may be secured in any other convenient manner. The wire B may be round, flat, or square, and it may be made of iron, brass, copper, or any other suitable metal, as may be desired or convenient. C are washers placed upon the axle at the inner and outer ends of the hub, to diminish friction. D is the linch-pin, by means of which the wheel is secured in place upon the axle in the ordinary manner.

Having thus described my invention, what I claim as new, and desire to secure by Letters Patent, is—

Winding the part of a wooden axle upon which the wheel revolves with metallic wire, substantially as herein shown and described, and for the purpose set forth.

F. McMANUS.

Witnesses:
  EDWARD CARPENTER,
  ELI CARPENTER.